Sept. 24, 1968        A. J. LITTLE        3,403,275

HYSTERESIS DRIVE WITH CONSTANT SPEED OUTPUT

Filed June 30, 1965

INVENTOR
Arthur J. Little

By Norton Lesser
Attorney

United States Patent Office 3,403,275
Patented Sept. 24, 1968

3,403,275
HYSTERESIS DRIVE WITH CONSTANT SPEED OUTPUT
Arthur J. Little, Springfield, Ill., assignor to Stewart-Warner Corporation, Chicago, Ill., a corporation of Illinois
Filed June 30, 1965, Ser. No. 468,460
1 Claim. (Cl. 310—103)

ABSTRACT OF THE DISCLOSURE

The following specification describes an hour meter operated by a constant speed output shaft coupled to a variable speed input shaft through a hysteresis drive. A magnet on the output shaft is coupled to an axially adjustable speed cup to provide an eddy current braking torque corresponding to the driving torque and thereby avoid the need for an escapement in the hour meter.

---

This invention relates in general to the use of a hysteresis coupling or drive for providing a constant speed output from a variable speed input and more particularly to a hysteresis coupling and a speed responsive load for ensuring a constant speed output despite input speed variations to enable a device such as a clock or the like to be driven at a constant speed without the use of an escapement or other frequency control.

Hysteresis couplings provide a very economical means for transforming power and developing a constant torque output. This output has been advantageously applied for driving the escapement mechanism of a clock or hour meter with the escapement ensuring a desired constant speed output.

Reflection on the constant torque characteristic of a hysteresis drive leads to the conclusion that if the load or retarding torque reaches a constant value, the output or load will be operated at a constant speed by the hysteresis drive.

It is therefore proposed in the present invention to eliminate the conventional escapement of a clock and utilize a hysteresis drive for operating a clock at a constant speed despite variations in input power or speed.

It is therefore one object of the present invention to provide a hysteresis drive for directly operating a constant speed device such as a clock.

Since the torque of a hysteresis drive is substantially constant, while the load my vary considerably, especially after starting, when the inertia of the load drops, constant speed may not ordinarily be achieved until the output is at high speed and its load correspondingly small.

It is therefore another object of the present invention to extend the range in which a constant speed output may be secured from a hysteresis drive by providing a load, which increases rapidly with output speed to ensure a substantially constant speed output at low input, high and variable input speeds.

Other problems in securing a constant speed output from a hysteresis drive result from changes in the system such as heat generated in the magnet, and where the drive is to be used for controlling a device to operate at a known speed, it is necessary to be able to select that speed despite variations resulting from manufacturing tolerances.

It is therefore still another object of the present invention to provide a hysteresis drive and a speed responsive load which varies so as to provide a constant speed output despite alterations in conditions.

It is still another object of the present invention to provide a hysteresis drive and a speed responsive load which is adjustable to select constant output speed.

It is a further object of the present invention to operate a time indicating device at a constant known rate from a source of variable power and without an escapement mechanism.

Other objects and features of this invention will become apparent on examination of the following specification, claim and drawings wherein:

Figure 1:
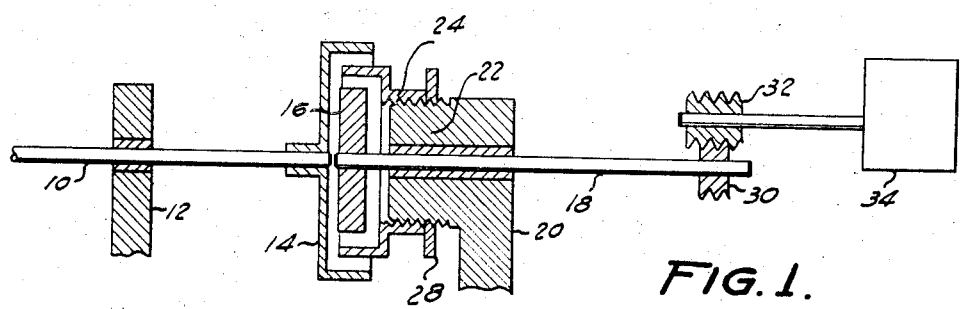
FIG. 1 is a sectional view illustrating one form of a hysteresis drive incorporating the principles of the present invention for operating a clock.

In FIG. 1 of the drawings an input shaft is indicated at 10. The shaft 10 is journalled in a suitable bearing support 12 and may be connected at one end, for example, to a flexible shaft under control, an engine or similar variable speed device. A hardened steel cup 14 is fixed to the other end of shaft 10 and rotates with the shaft to drive a permanent magnet 16. This forms a typical hysteresis coupling. The magnet 16 is fixed to one end of a shaft 18 journalled in a bearing support 20.

The bearing support 20 has a threaded boss 22 on which an aluminum or copper speed cup or eddy current device 24 is fixed. The speed cup 24 is adjustable axially with respect to the magnet and steel cup 14 for the purpose of varying the load exerted thereby on the drive, and a lock nut 28 holds the speed cup in its adjusted position.

The other end of shaft 18 carries a gear 30 for driving a gear 32. Gear 32 is coupled directly to the indicating apparatus of a clock or hour meter 34, for example,. without the use of an escapement and in the case of an hour meter drives a series of odometer wheels to indicate elapsed time.

Figure 3:
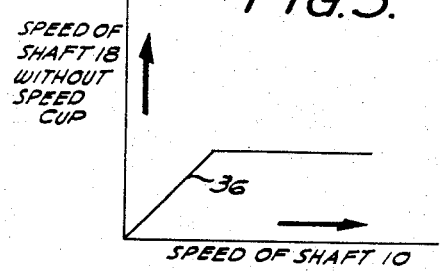
FIG. 3 is a graph illustrating the relationship between input and output speed resulting from the use of a hysteresis drive without a speed responsive load.

In the operation of a normal hysteresis drive, the speed of shaft 10 and output speed of shaft 18 without speed cup 24 vary proportionally, as seen in the graph shown in FIG. 3. By reference to line 36, it will be seen that as the torque overcomes the initial inertia of shaft 18 and the clock 34, that the speed of the two shafts increases, until the load becomes substantially constant. At this point the output speed is constant as indicated by the horizontal portion of line 36, and the hysteresis drive may be used for driving the clock without an escapement. The point at which constant speed is reached, however, will usually be considerably higher than desired.

Figure 4:
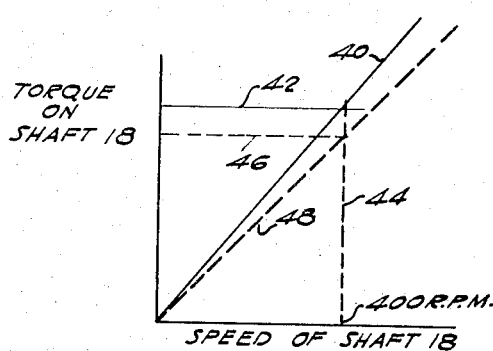
FIG. 4 is a graph illustrating the relationship between torque and output speed of an output device having a speed responsive load.

With speed cup 24, however, the eddy currents induced therein by the rotation of magnet 16, exert a retarding torque, which varies directly with the speed of magnet 16, as indicated by line 40 in the graph shown in FIG. 4. This retarding force is low or almost nonexistent when shaft 18 initiates rotation, but becomes progressively higher as the speed of the shaft 18 increases, until it approaches the constant torque indicated by line 42. The load of gears 30 and 32 and the clock 34 continues to drop as shaft 18 increases speed and represent a fraction of the total retarding torque. The net torque tending to rotate the shaft 18 therefore assumes a constant value, when shaft 18 is rotating at less than 500 r.p.m. as indicated by dashed line 44 and the constant speed of shaft 18 is provided over an extended range in velocity of the input shaft 10.

If variations in the system should occur such as aging or overheating of the magnetic components, the torque on the central shaft 18 may drop to the value indicated by broken line 46; however, the induced eddy current will also drop, as indicated by dashed line 48 so that the output speed of shaft 18 remains at the constant value, as indicated by line 44, despite the change in the system.

With the output speed of shaft 18 constant, its period of rotation is known and can be fixed. It will be appreciated that adjustment of the speed cup 24 axially controls its magnetic coupling to select a desired period of rotation. Conventionally, a marking may be placed on one of the members rotated by shaft 18 and examined under a strobe light, whose period is known. Speed cup 24 is adjusted until the period of the mark and lamp coincide to select the desired period of constant rotational frequency. With the period of rotation known, a selection of the gear ratios between gears 30 and 32 permits the timing device 34 to be driven at the appropriate rate.

It will be appreciated that load devices other than the speed cup 24, such as a simple propeller, may be utilized, as long as the load provided thereby varies proportionally to the speed, and preferably exceeds the load provided by the timing device 34 and gears 30 and 32 at comparatively low speeds of shaft 18 so as to mask the load effect created by those elements.

Figure 2:
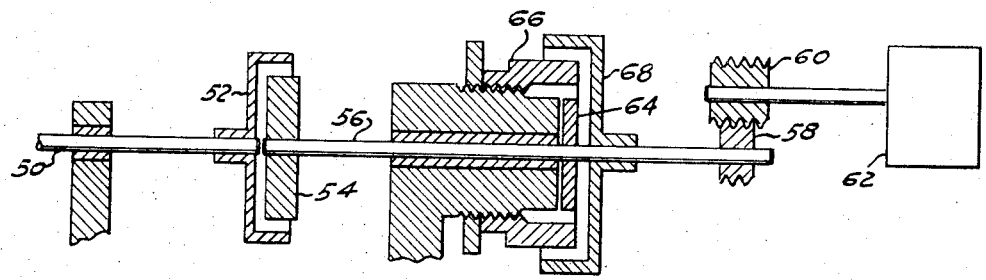
FIG. 2 illustrates a variation of the arrangement shown in FIG. 1.

FIG. 2 represents a slight modification of the arrangement shown in FIG. 1. An input shaft 50, carrying a steel cup 52, is suitably connected to a variable speed input device. A magnet 54 fixed to one end of a shaft 56 is driven by the steel cup for driving gears 58 and 60 and associated time indicating device 62. A second magnet 64 is fixed to shaft 56 intermediate its ends and it cooperates with an axially adjustable speed cup 66 to vary the retarding torque and thereby provide a constant speed output for shaft 56 despite input speed variations of shaft 50. A steel cup 68 can be provided to serve as a return path for magnet flux.

The inventive concepts in the foregoing description for providing a constant time output from a variable speed input are believed set forth in the accompanying claim.

What is claimed is:

1. A combination comprising an hour meter, a rotatable output shaft, a first magnetic member carried adjacent one axial position on said shaft for rotation with said shaft, an input shaft adapted to be driven at a variable speed, a magnetic member carried by said input shaft and coupled to said output shaft first magnetic member for rotating said output shaft, another magnetic member carried for rotation with said output shaft and spaced axially from said first magnetic member, a nonrotatable speed cup coupled with said other magnetic member for supplying a retarding torque to said output shaft proportional to the speed of said output shaft for maintaining said speed at a constant low value, means for adjusting said cup axially of said other magnetic member to select said constant speed at a value less than 500 r.p.m., and means directly coupling said output shaft and hour meter to drive said hour meter at a selected constant speed from said output shaft and thereby avoid an escapement for said hour meter.

References Cited

UNITED STATES PATENTS 2,807,734    9/1957    Lehde _____ 310—103
3,235,759    2/1966    Bowie _____ 310—103

ROBERT K. SCHAEFER, *Primary Examiner.*

H. O. JONES, *Assistant Examiner.*